United States Patent
Chaudhari et al.

(10) Patent No.: US 6,892,281 B2
(45) Date of Patent: May 10, 2005

(54) APPARATUS, METHOD, AND SYSTEM FOR REDUCING LATENCY OF MEMORY DEVICES

(75) Inventors: Sunil B. Chaudhari, Milpitas, CA (US); Bapi Vinnakota, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 10/264,115

(22) Filed: Oct. 3, 2002

(65) Prior Publication Data

US 2004/0068615 A1 Apr. 8, 2004

(51) Int. Cl.[7] .............................................. G06F 12/00
(52) U.S. Cl. ........................ 711/137; 711/168; 711/169; 711/154; 712/207
(58) Field of Search ................................. 711/137, 105, 711/154, 167; 712/205, 207, 215

(56) References Cited

U.S. PATENT DOCUMENTS

| | | | | |
|---|---|---|---|---|
| 5,822,772 A | * | 10/1998 | Chan et al. ................. | 711/158 |
| 6,138,213 A | * | 10/2000 | McMinn ..................... | 711/137 |
| 6,202,101 B1 | | 3/2001 | Chin et al. ..................... | 710/5 |
| 6,260,099 B1 | | 7/2001 | Gilberston et al. ......... | 710/240 |
| 6,269,433 B1 | | 7/2001 | Jones et al. ................. | 711/168 |
| 6,564,304 B1 | * | 5/2003 | Van Hook et al. .......... | 711/154 |
| 6,748,496 B1 | * | 6/2004 | Scarpino ..................... | 711/137 |
| 2002/0056027 A1 | * | 5/2002 | Kanai et al. ................ | 711/137 |
| 2004/0133747 A1 | * | 7/2004 | Coldewey ................... | 711/137 |

* cited by examiner

*Primary Examiner*—Donald Sparks
*Assistant Examiner*—Brian R. Peugh
(74) *Attorney, Agent, or Firm*—Blakely, Sokoloff, Taylor & Zafman LLP

(57) ABSTRACT

According to one embodiment of the invention, a method is provided in which memory requests from a first component and a second component are received. The memory requests are issued by the first component and the second component to access one or more memory devices via a memory controller. The memory requests received from the first component are accumulated in a first queue and the memory requests received from the second component are accumulated in a second queue, respectively. The memory requests accumulated in the first queue are sent to the memory controller for processing as a block of memory requests. The memory requests accumulated in the second queue are sent to the memory controller for processing as a block of memory requests.

26 Claims, 5 Drawing Sheets

… …

APPARATUS, METHOD, AND SYSTEM FOR REDUCING LATENCY OF MEMORY DEVICES

FIELD

An embodiment of the invention relates to memory controller technologies and data transfer technology between various components in computer and network systems, and more specifically, relates to an apparatus, method, and system for reducing latency of memory devices.

BACKGROUND

As computer and network devices and systems continue to advance and become more complex, effective and efficient data transfer between the various components in the computer and/or network processing systems have become more and more critical in system design and implementation. In particular, considerable effort and research has been focused on various mechanisms to reduce or hide memory latency in computer and network systems. In various processing applications such as network processing applications, in addition to the bandwidth of memory devices, the latency for memory accesses is also a significant performance limiter that affects the overall system performance. High-density memory devices such as synchronous dynamic random access memories (SDRAMs) usually have high latency in memory accesses to random locations in these memory devices. Furthermore, these memory devices have a variable latency that depends on the order of memory accesses to the various memory locations.

In a system configuration in which many system components may request memory accesses to the memory devices (e.g., SDRAMs) via a memory controller, the memory latency of these memory accesses can be very high due to the demands of the various system components which need access to the memory devices (e.g., read or write access) and the order in which the various memory access requests are processed or serviced by the memory controller. For example, in a typical system or application, a memory controller may receive memory access requests from several system components or devices (also called masters herein) to access the memory. Each master typically accesses a different area in the memory from other masters. In many applications, each of these masters accesses the memory with sequential memory addresses. In such a system or application, the latency may be very high as the memory controller typically will serve these various memory access requests from the various masters on a first-come-first-serve basis and have to incur multiple cycle penalty to switch between the different memory accesses requested by the different masters. For example, a component called master A may request access to row 1 in the memory whereas a component called master B may request access to row 50 in the memory. Subsequently, master A may request access to row 2 in the memory whereas master B may request access to row 51 in the memory. In this example, the memory controller typically will process request to access row 1 for master A and then switches to process request to access row 50 for master B, switch again to access row 2 for master A and then switch again to access row 51 for master B. As a result, the latency for accessing those various locations in memory is high and the memory controller suffer multiple cycle penalty to switch between accessing different rows in the memory.

BRIEF DESCRIPTION OF THE DRAWINGS

The invention may be best understood by referring to the following description and accompanying drawings that are used to illustrate embodiments of the invention, in which.

DETAILED DESCRIPTION

In the following detailed description numerous specific details are set forth. However, it is understood that embodiments of the invention may be practiced without these specific details.

In the discussion below, according to one embodiment of the invention, a method, apparatus, and system for reducing latency of memory devices are described. In one embodiment, an apparatus is provided which includes a memory controller coupled to one or more memory devices. The memory controller is responsible for processing or servicing memory requests issued by one or more system components (also called masters herein) to access the one or more memory devices. The apparatus also includes a plurality of queues each of which is used to store or accumulate memory requests issued by a corresponding component. In one embodiment, multiple memory requests issued by a particular component are accumulated in a queue associated with the particular component before the multiple memory requests are sent to the memory controller for processing. In one embodiment, the apparatus further includes a plurality of prefetch buffers each of which is used to store data prefetched by the memory controller for a corresponding component based on one or more memory read requests issued by the corresponding component. In response to a subsequent memory read request issued by a particular component which hits a prefetch buffer associated with the particular component, the prefetched data stored in the prefetch buffer is retrieved and sent to the particular component.

Figure 1:
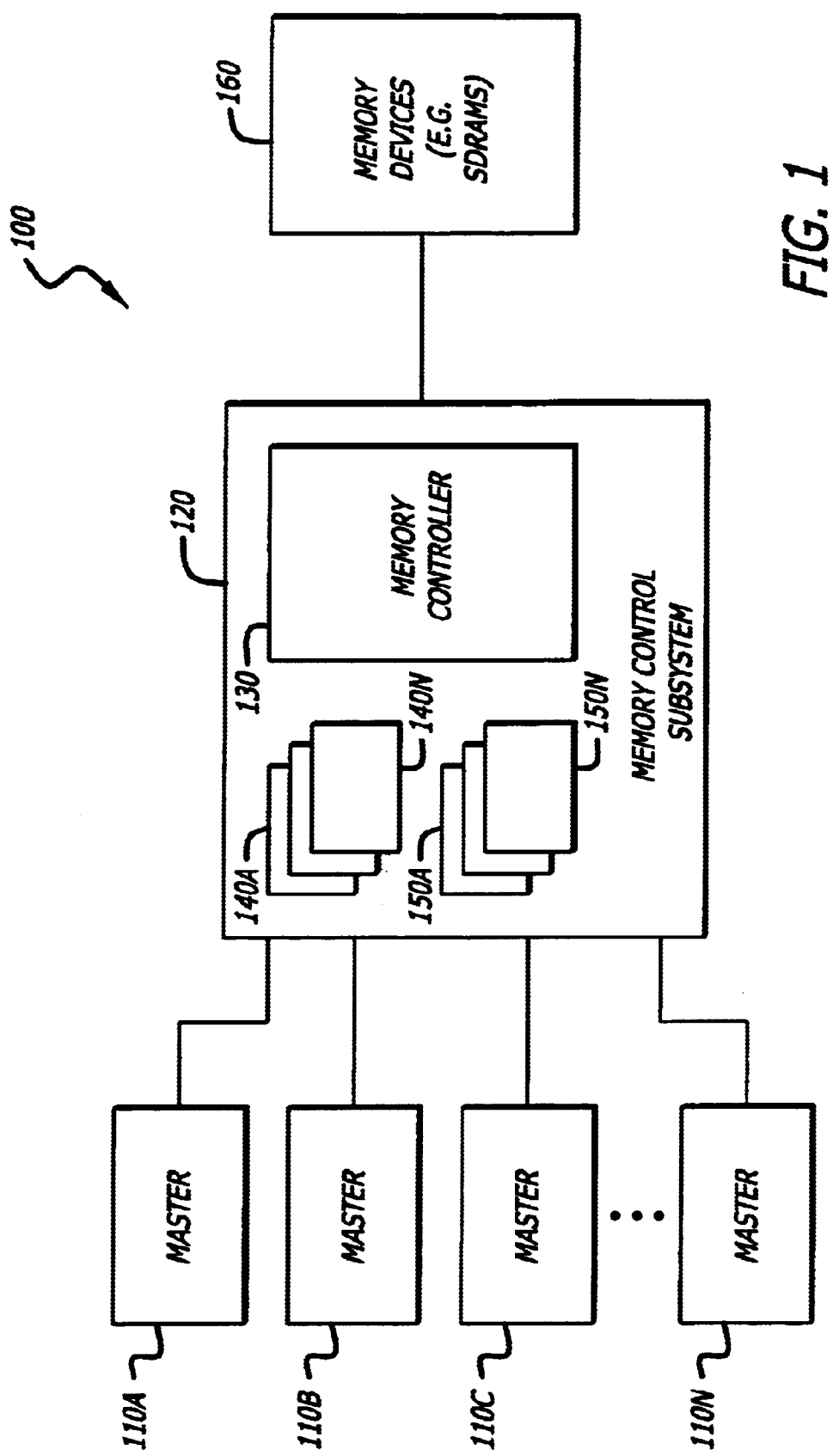
FIG. 1 is a block diagram of a system according to one embodiment of invention.

FIG. 1 is a block diagram of a system 100 according to one embodiment of invention. As shown in FIG. 1, the system 100 includes multiple components or devices 110A–N (also called masters) that are coupled to a memory control subsystem 120 to access data stored in memory devices 160 (e.g., SDRAMs). Each master 110 can read or write to the memory devices 160 by issuing the appropriate memory requests that are processed or serviced by a memory controller 130 which is included in the memory control subsystem 120. In one embodiment, the memory control subsystem 120 includes a separate queue (also called command queue herein) 140 and a separate prefetch buffer (also called prefetch queue herein) 150 for each respective master 110. Each of the queues 140A–N is used to store or accumulate memory requests (also referred to as memory commands) issued by the respective master 110. Each of the prefetch buffers 150A–N is used to store data prefetched by the memory controller 130 for the respective master 110, based on memory read requests issued by the respective master 110. The usage and operation of the queues 140A–N and the prefetch buffers 150A–N are described in more detail below.

Figure 2:
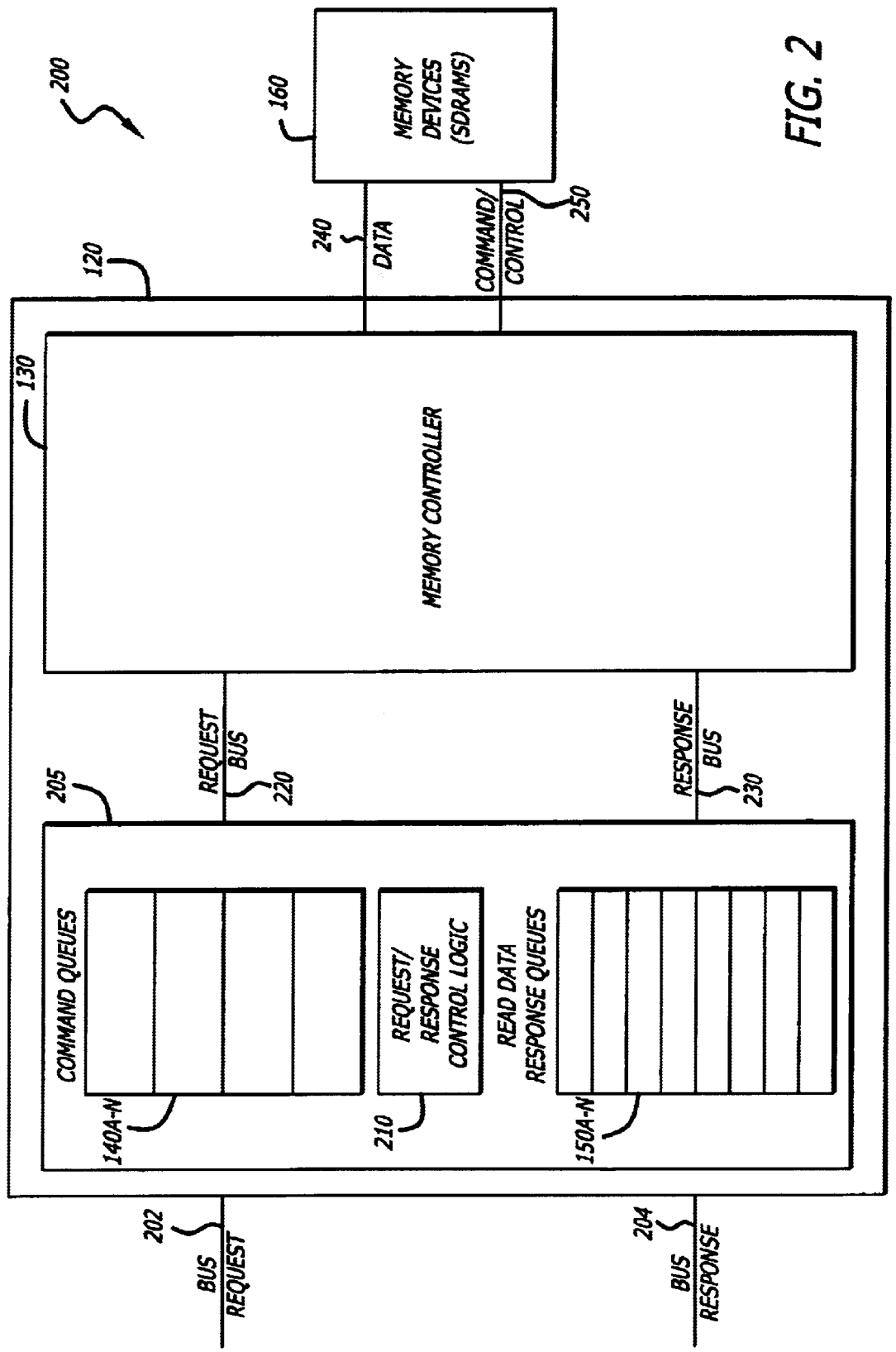
FIG. 2 shows a block diagram of a memory controller subsystem in accordance with one embodiment of the invention.

FIG. 2 shows a more detailed block diagram of the memory control subsystem 120 in accordance with one embodiment of the invention. As shown in FIG. 2, the memory control subsystem 120 includes a separate queue 140 and a separate prefetch buffer 150 for each master 110. The memory control subsystem 120 also includes request/response control logic 210 which controls the usage and operations of the command queues 140A–N and the prefetch buffers 150A–N. Each of the command queues 140A–N is used to store or accumulate the various memory requests issued by the associated master. For purposes of explanation and illustration, the queues 140A–N, the prefetch buffers 150A–N, and request/response control logic 210 can be logically grouped and referred to as memory interface unit or component 205. In one embodiment, multiple memory requests issued by a master 110 are accumulated in the associated queue 140 before these memory requests are sent to the memory controller 130 via request bus 220 for processing. Since the probability of accessing sequential memory locations in the memory devices 160 (e.g., SDRAMs) is relatively high with respect to consecutive memory requests (commands) from a single master 110, the memory controller 130 will not suffer multiple cycle penalty to switch between accessing different rows or locations in the memory devices 160.

In one embodiment, where an internal bus such as request bus 202 issues multiple read commands for each request in a burst of sequential accesses generated by a master 110, the memory controller 130 can read the entire burst requested by the first command before receiving subsequent requests in the burst. In one embodiment, the additional data that is read by the memory controller 130 before the request is received is stored in the prefetch buffer (also called read response queue) 150 for the respective master. As subsequent read requests are received in the burst, the requested data are retrieved from the corresponding prefetch buffer 150 instead of being fetched from the memory devices 160. Retrieving data from the corresponding prefetch buffer 150 results in reduced latency.

In one embodiment, since the probability that the commands from a single master will have spatial locality is high (e.g., any single master usually accesses the memory devices with sequential memory addresses), it would be more efficient to process a block of a master's memory requests before moving on to the next master's requests. Thus, substantial savings in overhead processing can be achieved when switching between different rows or locations of the memory devices 160.

In one embodiment, the number of memory requests to be processed as a block for one master can be determined based on various factors. These various factors may include a first factor which corresponds to memory bandwidth availability and a second factor which corresponds to the number of components or devices (masters) that issue memory requests to access the memory devices 160 via the memory controller 130. In addition, the various factors may include a third factor which corresponds to the types of memory requests issued and a fourth factor which corresponds to the number of pending memory requests in the respective queue. In another embodiment, the number of memory requests to be processed as a block can be predetermined. For example, every five (or ten, etc.) memory requests accumulated in a queue may be processed as a block. It should be understood and appreciated by one of ordinary skill in the art that the number of memory requests to be processed as a block may vary or set differently depending on the various implementations and applications of the invention.

Figure 3:
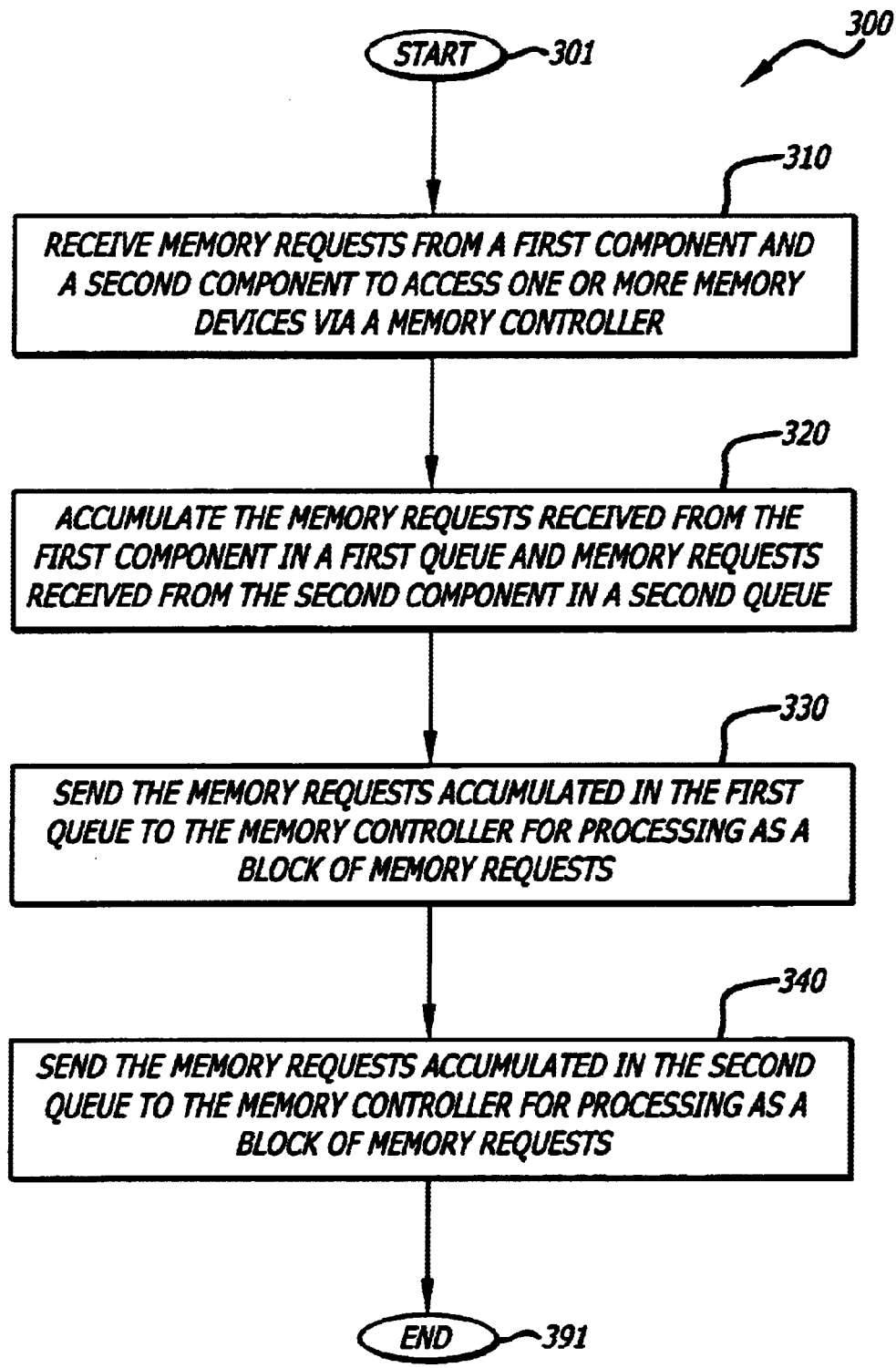
FIG. 3 illustrates a flow diagram of a method in accordance with one embodiment of the invention.

FIG. 3 illustrates a flow diagram of a method in accordance with one embodiment of the invention. At block 310, memory requests from a first component (first master) and a second component (second master) are received. As described above, in one embodiment, these memory requests are issued by the first and second components to access memory devices via the memory controller. At block 320, the memory requests received from the first and second components are accumulated or stored in a first queue and a second queue, respectively. The first queue is designated to store memory requests received from the first component and the second queue is designated to store memory requests received from the second component. In other words, the first queue is associated with the first component and the second queue is associated with the second component, respectively. At block 340, the memory requests accumulated in the first queue are sent to the memory controller to be processed as a block of memory requests. At block 350, the memory requests accumulated in the second queue are sent to the memory controller to be processed as a block of memory requests. As discussed above, it is much more efficient for the memory controller to process multiple memory requests issued by one master consecutively because the probability of accessing sequential memory locations in the memory devices (e.g., SDRAMs) is relatively high with respect to consecutive memory requests (commands) from a single master. Therefore, the memory controller will not suffer multiple cycle penalty to switch between accessing different rows or locations in the memory devices. Similarly, since the probability that the requests or commands from a single master will have spatial locality is high (e.g., any single master usually accesses the memory devices with sequential memory addresses), it would be more efficient to process a block of one master's memory requests before moving on to the next master's requests.

Figure 4:
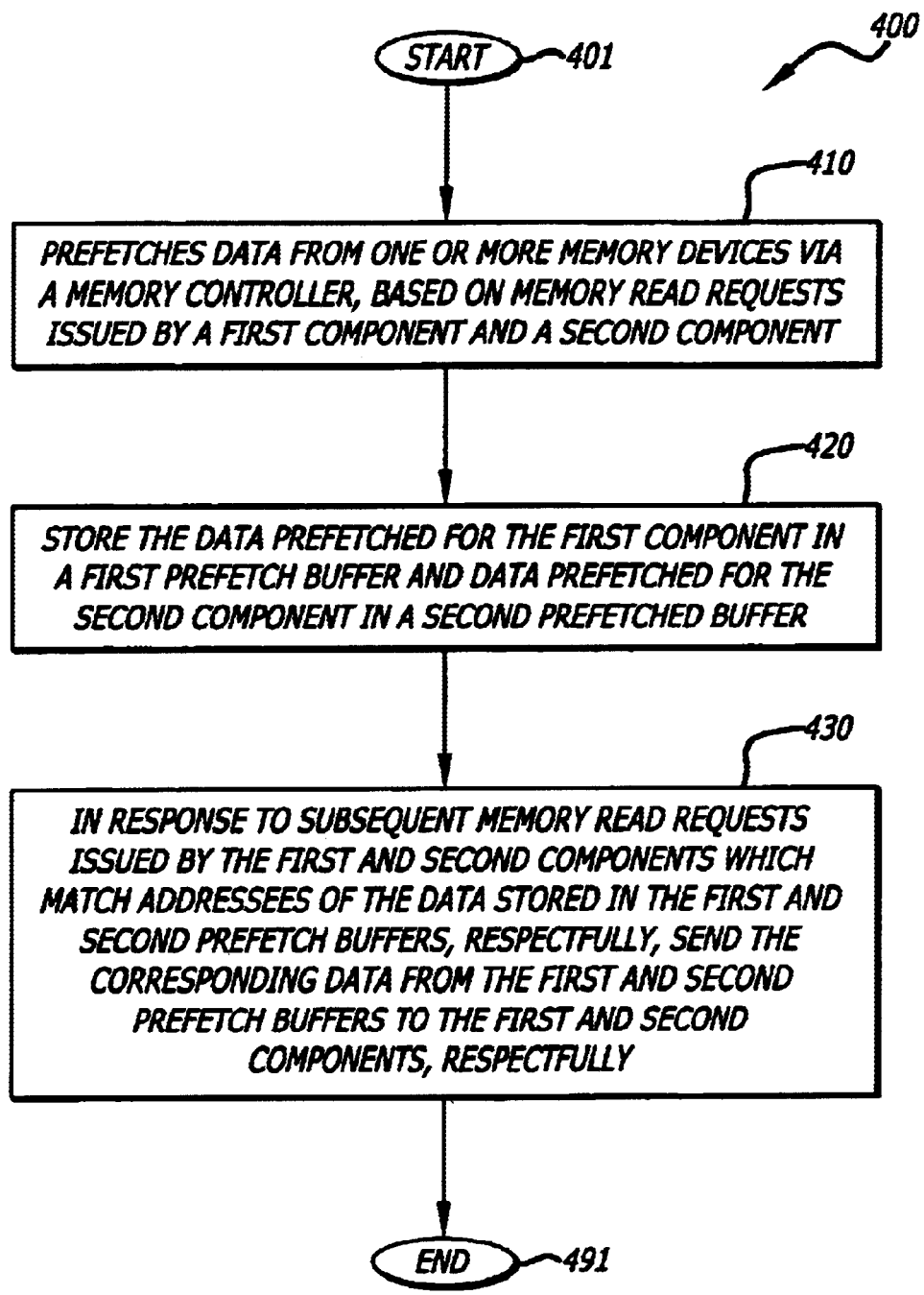
FIG. 4 illustrates a flow diagram of a method according to one embodiment of the invention.

FIG. 4 illustrates a flow diagram of a method according to one embodiment of the invention. At block 410, a memory controller prefetches data from one or more memory devices, based on memory read requests issued by a first component (first master) and a second component (second master). At block 420, the data prefetched for the first component are stored in a first prefetch buffer and the data prefetched for the second component are stored in a second prefetch buffer. The first prefetch buffer is a buffer that is designated to store prefetched data for the first component and the second prefetch buffer is a buffer that is designated to store prefetched data for the second component. At block 430, in response to subsequent memory read requests received from the first and second components, the corresponding prefetched data are retrieved from the first and second prefetch buffers and sent to the first and second components, respectively.

Figure 5:
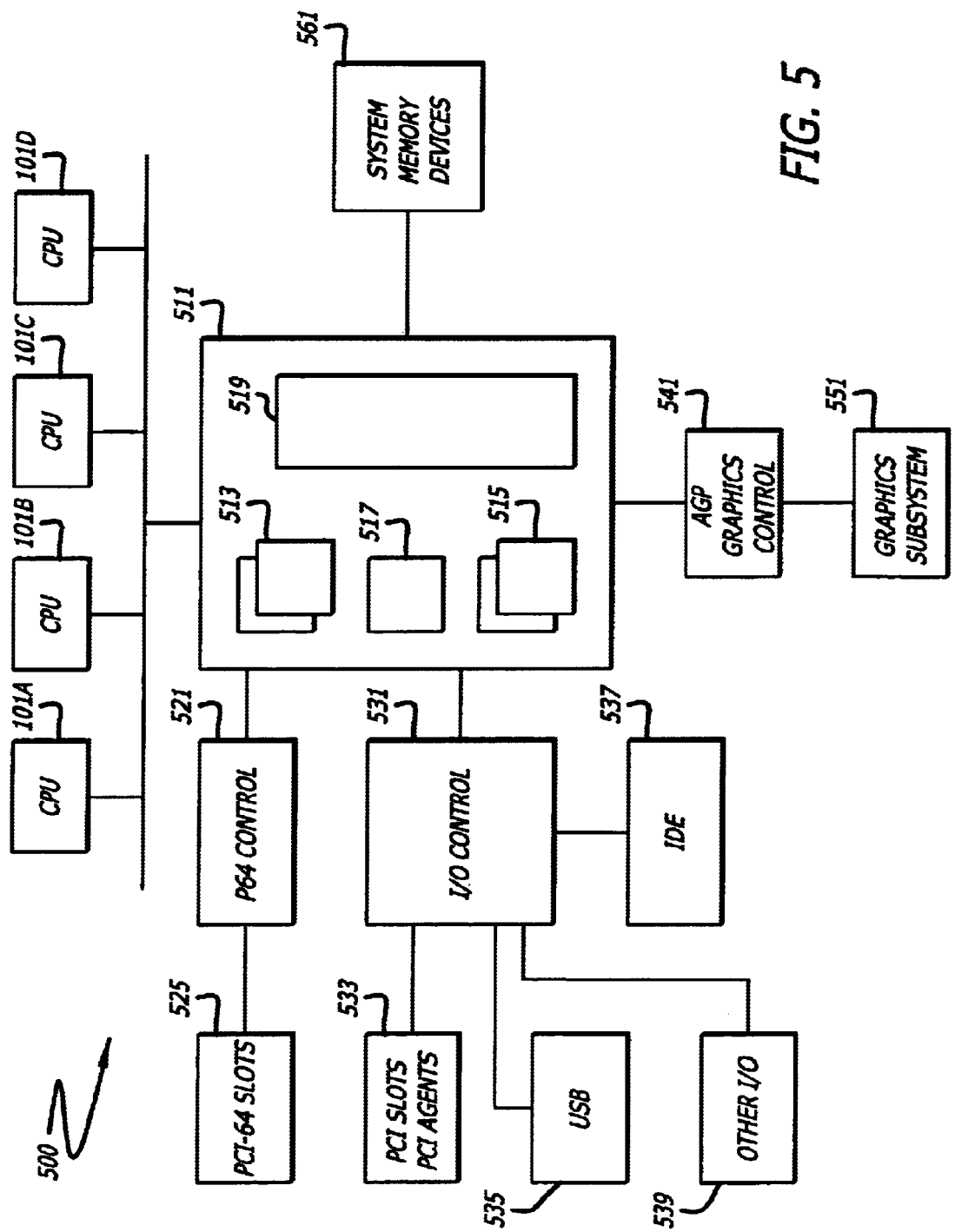
FIG. 5 shows a block diagram of a system according to one embodiment of the invention.

FIG. 5 shows a block diagram of a system 500 according to one embodiment of the invention. The system 500 includes a plurality of central processing units (CPUs) or processors 501a–d, a memory control subsystem (also called memory control unit) 511, a P64 control unit 521, an Input/Output (IO) control unit 531, a graphics controller 541 coupled to a graphics subsystem 551, and a plurality of memory devices 561. The processors 501a–d can be general-purpose processors, special-purpose processors, digital signal processors (DSPs), packet processors, etc. In one embodiment, the processors 501a–501d are general-purpose microprocessors that are capable of executing an Intel Architecture instruction set. The CPUs 501a–501d, the P64 control unit 521, the IO control unit 531, and the AGP graphics control unit 541 access the system memory devices 561 via the memory control unit 511. The memory control unit 511, in one embodiment, is responsible for servicing all memory transactions that target the system memory devices 561. The memory control unit 511 can be a stand-alone unit, an integrated part of a chipset, or a part of some larger unit that control the interfaces between various system components and the system memory devices 561. The P64 control unit 521 provides the interface control between a plurality of PCI-64 slots 525 and the memory control unit 511. The IO control unit 531 provides the interface control between the memory unit 511 and various IO devices and ports including the PCI slots and PCI agents 533, a plurality of USB ports 535, a plurality of IDE ports 537, and other IO devices 539. The AGP graphics control unit 541 provides the interface control between the graphics subsystem 551 and the memory control unit 511.

In one embodiment, the memory control unit 511 includes a separate queue 513 and a separate prefetch buffer 515 for each system component that access memory devices 561 via the memory control unit 511. The memory control subsystem 511 also includes request/response control logic 517 which controls the usage and operations of the command queues 513 and the prefetch buffers 515. As described above with respect to FIGS. 1 and 2, each of the command queues 513 can be used to store or accumulate the various memory requests issued by the associated component (e.g., CPU 501). In one embodiment, multiple memory requests issued by a system component such as CPU 501 are accumulated in the associated queue 513 before these memory requests are sent to the memory controller 519 for processing.

In one embodiment, the memory controller 519 may perform prefetch operations to prefetch data from memory devices 561, base on memory read requests received from the various system components. For example, when a system component issues multiple read requests in a burst of sequential accesses, the memory controller 519 can read the entire burst requested by the first memory request before receiving subsequent requests in the burst. The prefetched data read by the memory controller 519 is stored in the prefetch buffer 515 for each respective system component. As subsequent read requests are received in the burst, the requested data can be retrieved from the corresponding prefetch buffer 515 instead of being fetched from the memory devices 561.

In one embodiment, since the probability that the commands from one system component (e.g., CPU 501) will have spatial locality is high, it would be more efficient for the memory controller 519 to process a block of one component's memory requests before processing the next component's requests. In one embodiment, the number of memory requests to be processed as a block for one system component can be determined based on various factors as described above. In another embodiment, the number of memory requests to be processed as a block by the memory controller 519 can be predetermined.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:

a memory controller coupled to one or more memory devices, the memory controller to process memory requests issued by one or more components to access the one or more memory devices;

a plurality of prefetch buffers each of which is used to store data prefetched by the memory controller for a corresponding component based on one or more memory read requests issued by the corresponding component; and a plurality of queues each of which to store memory requests issued by a corresponding component, wherein multiple memory requests issued by a particular component are accumulated in a queue associated with the particular component before the multiple memory requests are sent to the memory controller for processing.

2. The apparatus of claim 1 wherein, in response to a subsequent memory read request issued by a particular component which hits a prefetch buffer associated with the particular component, the prefetched data stored in the prefetch buffer is sent to the particular component.

3. The apparatus of claim 1 wherein the memory controller processes a block of memory requests issued by one component before processing requests issued by another component.

4. The apparatus of claim 1 wherein the memory controller processes a block of memory requests issued by an IO control unit before processing requests issued by a graphics control unit.

5. The apparatus of claim 1 wherein the memory controller processes a block of memory requests issued by a graphics control unit before processing requests issued by an IO control unit.

6. An apparatus comprising:

a memory controller coupled to one or more memory devices, the memory controller to process memory requests issued by one or more components to access the one or more memory devices;

a plurality of queues each of which to store memory requests issued by a corresponding component, wherein multiple memory requests issued by a particular component are accumulated in a queue associated with the particular component before the multiple memory requests are sent to the memory controller for processing, the memory controller processes a block of memory requests issued by one component before processing requests issued by another component, and a number of memory requests to be processed as a block by the memory controller is determined based on one or more factors selected from the group consisting of a first factor corresponding to memory bandwidth availability, a second factor corresponding to a number of components which generate memory requests to access the one or more memory devices, a third factor corresponding to the types of memory requests issued, and a fourth factor corresponding to number of pending memory requests in each queue.

7. The apparatus of claim 6, wherein the number of memory requests issued by one component to be processed as a block is predetermined.

8. The apparatus of claim 6 wherein the one component is an IO control unit.

9. The apparatus of claim 6 wherein the one component is a graphics control unit.

10. A method comprising:

receiving memory requests from a first component and a second component to access one or more memory devices via a memory controller;

accumulating the memory requests received from the first component in a first queue and memory requests received from the second component in a second queue;

sending the memory requests accumulated in the first queue to the memory controller for processing;

sending the memory requests accumulated in the second queue to the memory controller for processing;

prefetching data from the one or more memory devices based on memory read requests from the first and second components;

storing data prefetched for the first component in a first prefetch buffer and data prefetched for the second component in a second prefetch buffer; and in response to subsequent memory read requests which match addresses of the data stored in the first and second prefetch buffers, sending the corresponding data from the first and second prefetch buffers to the first and second components, respectively.

11. The method of claim 10 wherein the memory controller processes a block of memory requests issued by one component before processing requests issued by another component.

12. The method of claim 10 wherein the memory controller processes a block of memory requests issued by one component before processing requests issued by another component.

13. The method of claim 10 wherein the memory controller processes a block of memory requests issued by an IO control unit before processing requests issued by a graphics control unit.

14. The method of claim 10 wherein the memory controller processes a block of memory requests issued by a graphics control unit before processing requests issued by an IO control unit.

15. A method comprising:

receiving memory requests from a first component and a second component to access one or more memory devices via a memory controller;

accumulating the memory requests received from the first component in a first queue and memory requests received from the second component in a second queue;

sending the memory requests accumulated in the first queue to the memory controller for processing;

sending the memory requests accumulated in the second queue to the memory controller for processing;

prefetching data from the one or more memory devices based on memory read requests from the first and second components;

storing data prefetched for the first component in a first prefetch buffer and data prefetched for the second component in a second prefetch buffer;

in response to subsequent memory read requests which match addresses of the data stored in the first and second prefetch buffers, sending the corresponding data from the first and second prefetch buffers to the first and second components, respectively; and wherein the memory controller processes a block of memory requests issued by one component before processing requests issued by another component and the number of memory requests issued by one component to be processed as a block by the memory controller is determined based on one or more factors selected from the group consisting of a first factor corresponding to memory bandwidth availability, a second factor corresponding to a number of components which need access to the one or more memory devices, a third factor corresponding to the types of memory requests issued, and a fourth factor corresponding to number of pending memory requests in each queue.

16. The method of claim 15 wherein the one component is an IO control unit.

17. The method of claim 15 wherein the one component is a graphics control unit.

18. A method comprising:

receiving memory requests from a first component and a second component to access one or more memory devices via a memory controller;

accumulating the memory requests received from the first component in a first queue and memory requests received from the second component in a second queue;

sending the memory requests accumulated in the first queue to the memory controller for processing;

sending the memory requests accumulated in the second queue to the memory controller for processing;

prefetching data from the one or more memory devices based on memory read requests from the first and second components;

storing data prefetched for the first component in a first prefetch buffer and data prefetched for the second component in a second prefetch buffer;

in response to subsequent memory read requests which match addresses of the data stored in the first and second prefetch buffers, sending the corresponding data from the first and second prefetch buffers to the first and second components, respectively; and wherein the memory controller processes a block of memory requests issued by one component before processing requests issued by another component and the number of memory requests issued by one component to be processed as a block is predetermined.

19. The method of claim 18 wherein the one component is an IO control unit.

20. The method of claim 18 wherein the one component is a graphics control unit.

21. A system comprising:

a plurality of digital signal processors;

a memory; and a memory controller coupled to the plurality of digital signal processors and the memory, the memory controller to process memory requests issued by the plurality of digital signal processors to access the memory, the memory controller comprising:

a plurality of queues each of which is associated with one digital signal processor, each queue is used to accumulate memory requests issued by the associated digital signal processor, wherein multiple memory requests issued by a particular digital signal processor are accumulated in a queue associated with the particular digital signal processor before the multiple memory requests are sent to the memory controller for processing.

22. The system of claim 21 wherein the memory controller further including:

a plurality of prefetch buffers each of which is associated with one digital signal processor, each prefetch buffer to store data prefetched by the memory controller for the respective digital signal processor based on one or more memory read requests issued by the respective digital signal processor.

23. The system of claim 22 wherein, in response to a subsequent memory read request issued by a particular digital signal processor which hits a prefetch buffer associated with the particular digital signal processor, the prefetched data stored in the prefetch buffer is sent to the particular digital signal processor.

24. The system of claim 21 wherein the memory controller processes a block of memory requests issued by one digital signal processor before processing requests issued by another digital signal processor.

25. The system of claim 24 wherein the number of memory requests to be processed as a block by the memory controller is determined based on one or more factors selected from the group consisting of a first factor corresponding to memory bandwidth availability, a second factor corresponding to the number of digital signal processors, a third factor corresponding to the types of memory requests issued, and a fourth factor corresponding to the number of pending memory requests in each queue.

26. The system of claim 24 wherein the number of memory requests issued to be processed as a block is predetermined.

* * * * *